Sept. 2, 1969  C. E. ENGLE ET AL  3,464,508
FORCE TRANSDUCER OUTPUT MEASURING
SYSTEM EMPLOYING RATIO TECHNIQUE
Filed Oct. 21, 1966
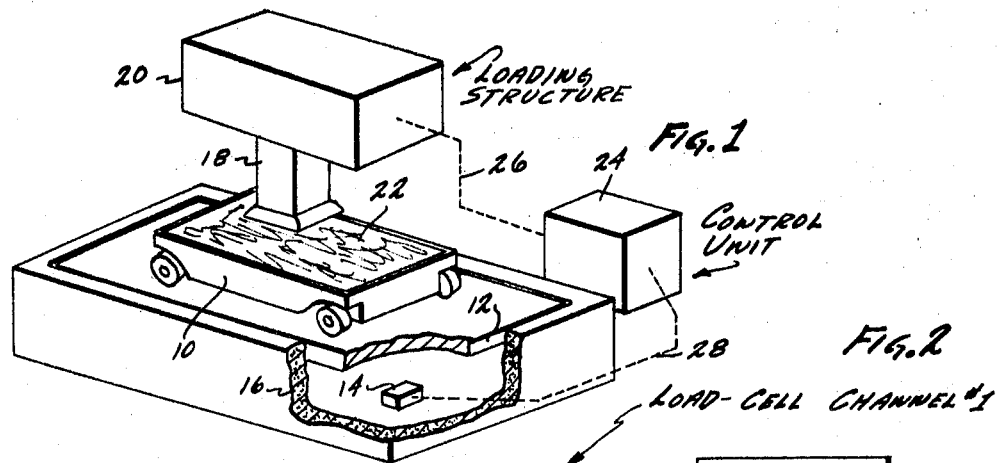
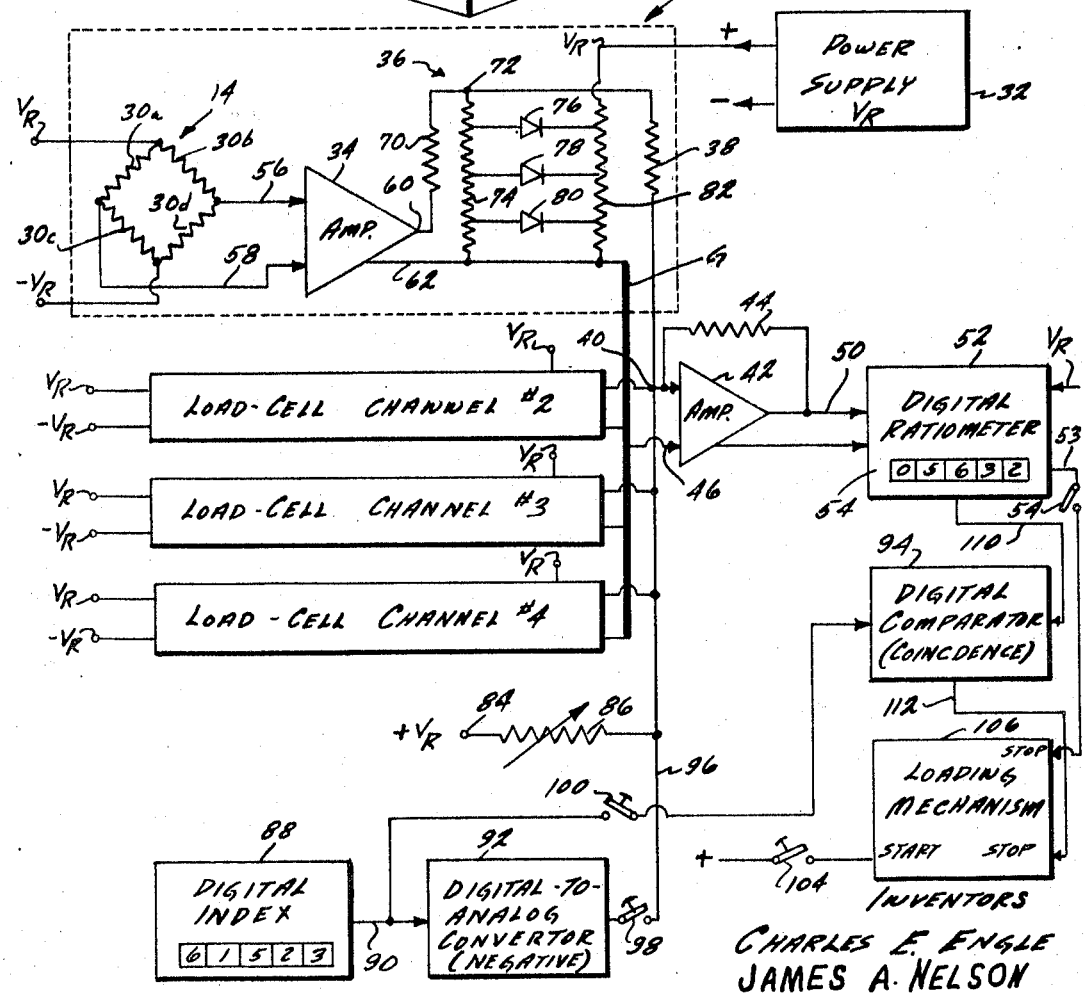
INVENTORS
CHARLES E. ENGLE
JAMES A. NELSON
BY Wilson, Robbins Anderson
ATTORNEYS

United States Patent Office 3,464,508
Patented Sept. 2, 1969

3,464,508
FORCE TRANSDUCER OUTPUT MEASURING SYSTEM EMPLOYING RATIO TECHNIQUE
Charles E. Engle, Tustin, and James A. Nelson, Costa Mesa, Calif., assignors to Dana Laboratories, Inc., a corporation of California
Filed Oct. 21, 1966, Ser. No. 588,516
Int. Cl. G01g 23/14
U.S. Cl. 177—164      5 Claims

ABSTRACT OF THE DISCLOSURE

An electronic weight measuring system is disclosed wherein a voltmeter, load cells, and a tare weight potentiometer are all driven in a ratio by a single source of supply potential, thereby affording accurate operation (especially with multiple load cells) in spite of voltage fluctuations. Isolating diode networks are disclosed for each of the load cells to linearize outputs in accordance with amplitude.

---

The present invention relates to an electrical measuring system and more specifically to such a system for accurately indicating measurements of weight, force, and similar related quantities.

Although the present invention is applicable to measurement of electrical signals developed by one or more force transducers upon application of loads thereto, it will be specifically described with respect to a weight indicating system.

As a result of various relatively recent developments, electrical weight indicating systems have been proposed in several practical applications. One rather typical form of previously proposed system includes a rigid platform supported by a plurality of electrical load cells which develop electrical signals, the sum of which then indicates the total applied load. Systems of this type have been proposed with the objective of avoiding complex mechanical linkages while providing the capability of rapid response to load changes. However, certain difficulties generally have existed in most prior systems with the result that such structures have not come into widespread use. Specifically, for example, in prior systems the power supply providing electrical energy to each individual load cell was required to be extremely stable if good accuracy were to be accomplished. Furthermore, in general, even in rather sophisticated prior systems, the accuracy and stability have been far less than the inherent capabilities of the individual load cells due to interaction between the load cells, tare-weight variations and so on. As for the accuracy of individual load cells of the prior art, they are generally somewhat nonlinear resulting in a further loss of accuracy.

Accordingly, it is an object of the present invention to provide an improved electrical force measuring indicator, which is more accurate in operation and which can be economically embodied in a relatively rugged and durable structure.

It is another object of the present invention to provide an improved electrical force measuring system which obtains greater accuracy and stability as a result of certain independence from power-supply variations.

It is another object of the present invention to provide an improved electrical measuring system utilizing a plurality of load cells, wherein each cell is substantially independent and wherein signals from each of the cells are algebraically combined along with control signals, as well as signals provided from cooperating structure for manifesting tare weight.

Still another object of the present invention is to provide an improved electrical measuring system wherein a plurality of load cells is employed to provide a combination or aggregate signal indicative of the load carried thereby, which signal is combined with the power supply voltage to manifest a load-indicating ratio in which power supply variations are negated, thereby presenting a measurement which is the total of the passive transfer functions of the load cells.

One further object of the present invention is to provide a measuring system incorporating a plurality of isolated load cells, which may be independently scaled, the outputs of which also may be independently linearized for algebraic summation along with signals provided from other structures indicative of tare weight and so on.

FIGURE 1 is a perspective and schematic diagram of a weight indicating system constructed in accordance with the present invention; and FIGURE 2 is a schematic circuit diagram illustrating the electrical system embodied in the structure of FIGURE 1.

A measuring system constructed in accordance with the present invention generally includes a plurality of electrical load cells, all of which are energized by a reference potential to provide signals indicative of the load supported by the individual cells. The signals are then individually passed through an isolation means, as a differential amplifier, and through a linearizing circuit which is also referenced to the reference potential. The output from the individual linearizing circuits is then algebraically combined, as by an operational amplifier to provide an aggregate signal which is applied to a ratiometer along with the reference potential. As a result, the ratiometer manifests the measurement as a ratio from which variations in the reference potential are substantially cancelled. The system may also incorporate structure for providing a signal indicative of tare weight for algebraic summation with the load cell component signals so as to effectively meter the net weight of a load. Still further, the system may also incorporate a loading control unit which is operated in accordance with the manifestations of the ratiometer in relation to an established standard.

Considering the system hereof in greater detail, reference will now be made to FIGURE 1, showing a load vehicle 10, borne upon a platform 12 which is in turn carried on a plurality of load cells 14. Of course, a single load cell may be used or the load cells 14 may be variously disposed to support the platform 12; however, in accordance with one arrangement, one load cell 14 is mounted under each corner of the platform 12. The load cells 14 are in turn supported in a base 16 which also defines a space within which the platform 12 is received.

The load vehicle 10 is filled with the substance to be weighed through a duct or channel 18 from a loading structure 20 which may take many different physical forms. Specifically, the loading structure 20 may comprise any of a wide variety of bulk-handling machines as well known in the prior art and widely used, for delivering bulk substance 22 through the channel 18 into the bed of the load vehicle 10.

The operating periods of loading structure 20 are determined by a control unit 24 acting through a control link 26 which may be electrical, mechanical, hydraulic, etc. as well known in the prior art. The control unit 24 is electrically coupled to each of the load cells 14 as indicated by a coupling 28 comprising an electrical cable as described in detail below.

Considering an exemplary operation of the system as physically represented in FIGURE 1, the sequence of events may be initiated by placing the load vehicle 10 on the platform 12. Next, an adjustment is made at the control unit 24 to compensate the tare weight of the vehicle 10. Thereafter, the control unit 24 is set to indicate the desired weight of the substance 22 which is to be dispensed from the loading structure 20 into the vehicle 10. Thereafter, the control unit 24 is actuated to start the loading operation.

As the loading operation of the vehicle 10 proceeds, the increased weight is continually sensed by the load cells 14 which provide indicative electrical signals through the coupling 28 to the control unit 24. The control unit 24 includes an electrical system (described in detail below) which operates in cooperation with the individual load cells 14 to manifest the weight of the substance 22 contained in the vehicle 10. When the manifest weight of the substance 22 equals the desired load weight of the substance 22, the control unit 24 halts operation of the loading structure 20 through the connective control link 26. As a result, the vehicle 10 is accurately loaded to the desired weight and may now be removed from the platform 12.

Although the physical structure represented in FIGURE 1 provides one exemplary system hereof, it is to be understood that the inventive system may be utilized in a wide variety of other measuring application. Of course, in some applications it will be desirable simply to manifest or indicate force or weight, whereas in other applications a control function will be performed as described with respect to FIGURE 1. Also, as is readily apparent, the system may take widely different forms depending upon the magnitudes of loads which are to be measured. Still further, it is to be understood that various modifications may be made in the illustrative electrical system within the scope hereof which system will now be considered with reference to FIGURE 2.

The load cells 14 as shown in FIGURE 2 may each comprise a bridge of strain gauges as well known in the prior art which are representatively indicated in FIGURE 2 by resistors 30a, 30b, 30c, and 30d. The load cell 14 comprising these components is shown in detail only in load cell channel #1. However, similar load cells 14 are also present in load cell channels #2, #3, and #4. That is, each of the load cell channels #1, #2, #3 and #4 are similar, and include a load cell along with other structure for providing a component signal, which signals are summarized at the output from the load cell channels.

As shown in detail in the illustrated load cell channel #1, the load cell 14 is connected to be energized by a reference potential $V_R$ from a power supply 32. The potential $V_R$ of the power supply 32 is applied across the load cell 14 at the bridge junction point between the resistors 30a and 30b, and the junction point between the resistors 30c and 30d. The output signal from the load cell 14 is developed across the junction point between the resistors 30a and 30c and the junction point between the resistors 30b and 30d, for application to an isolation circuit in the form of a differential amplifier 34.

The signal output from the differential amplifier 34 is applied to a linearizing network 36 which is also connected to receive the potential $V_R$ from the power supply 32. In function, the linearizing network 36 adjusts the signal output from the amplifier 34 to provide a better proportionate relationship thereof to load variation. Output from the network 36 is through a resistor 38 to a junction point 40. The junction point 40 receives a component signal from each of the load cell channels #1, #2, #3 and #4, resulting in a composite or aggregate signal which is algebraically summarized by an operational amplifier 42. The operational amplifier 42 may incorporate a feedback loop as well known in the prior art for more linear operation, through a resistor 44 as indicated. The operational amplifier 42 (through a conductor 46) along with each of the other load cell channels is connected to a common bus shown in heavy line and designated G.

The output from the operational amplifier 42, comprising the algebraic sum of each of the component load indicating signals is applied through a conductor 50 to a digital ratiometer 52, which also receives the potential $V_R$ from the power supply 32. Functionally, the digital ratiometer 52 manifests digital indications representative of the ratio of the signal in the conductor 50 to the amplitude of the potential $V_R$. That is, the digital ratiometer 52 provides a visual display in a window 54 which is representative of the aggregate load signal in a ratio with the reference potential $V_R$. As a result, the indications provided by the digital ratiometer 52 purely manifest the transfer function of the load cells 14 as modified by the linearizing networks 36. That is true because variations in the potential $V_R$ provided by the individual power supply 32 are essentially cancelled in the ratios by the ratiometer to provide a total measurement which is substantially immune from power supply fluctuations.

Prior to considering the operation of the total system in greater detail, further analysis of the similar load cell channels will be considered with reference to load cell channel #1. As indicated, the load cell 14, as shown represented by resistances 30a, 30b, 30c, and 30d, is provided in the form of a bridge which is energized by the potential $V_R$ from the power supply 32. The potential $V_R$ thus provides an excitation voltage which results in an output signal appearing at the opposite terminals of the bridge circuit and received in the conductors 56 and 58 providing inputs to the amplifier 34. Of course, the amplifier 34 may include internal feedback loops as well known in the prior art and, for example, shown in the patent to Braymer and Engle, 3,189,840. The isolated output from the amplifier 34 is to conductors 60 and 62. Thus, the input to the load cells 14 and the output to the conductors 60 and 62 may be considered a bipolar four-wire network as shown in load cell channel #1 which may be employed to accomplish the desired ratio measurement. In this regard, it is to be noted that the individual component signals which define the numerator in the ratio measurement may be positive or negative with respect to a fixed polarity reference potential $V_R$.

The component signals appearing across the conductors 60 and 62 generally will be expected to be somewhat nonlinear as a result of the inherent nature of many prior load cells. The requisite correction involves a deviation in the output signal which varies in a particular pattern in relation to the amplitude of the output signal. The correction provided in the system of FIGURE 2 is accomplished by a plurality of diodes which is rendered conductive at various levels of the output signal to adjust and linearize that signal by a best straight line approximation of the load cell nonlinearity curve.

The input to the linearizing network 36 is through a resistor 70 to a junction point 72 to which the output resistor 38 is connected along with a multitapped resistor 74. The taps of the resistor 74 are connected respectively through diodes 76, 78 and 80 to taps on a multitapped resistor 82. The resistor 82 is connected from the conductor 62 directly to receive the potential $V_R$ from the power supply 32.

In the operation of the linearizing network 36, when the component signal output across the resistor 74 is relatively low, the diodes 76, 78 and 80 (the cathodes of which are connected to the resistor 82) are nonconducting. That is, the low component signal across the resistor 74 is less than the reference potential applied across the resistor 82 with the result that each of the diodes is reverse biased. However, as the applied component output signal increases, a stage occurs at which the diode 80 becomes forward biased thereby lowering the effective amplitude of the component signal appearing at the junction point 72. That is, as the diode 80 becomes conductive the interconnected tap on the resistor 74 is driven to the potential level of the tap on the resistor 82. Thus the desired linear curve is more nearly approached. As will be recognized by those skilled in the art the resistor 82 may be a variable resistor having a plurality of movable contacts each connected to a different one of the diodes. Thus, the arrangement as provided herein permits independent scaling and linearizing of the individual load cells 14. That is, each of the load cell channels may contain a load cell requiring distinctly different linearization or scaling. Therefore, the present arrangement permits individual accomplishment of such linearization.

The output from the linearizing network 36, as previously indicated, is through a resistor 38 to the junction point 40. The component signals received at the junction point 40, also as previously indicated, are independently algebraically summarized by the operational amplifier 42 since, as is well known, the input summing terminal of any high gain operational amplifier is at virtual ground and there can be no interaction between input signals applied at the summing point. In addition to the signals provided from the load cells 14, a signal representative of tare weight may also be applied to the junction point 40. That is, the potential $V_R$ from the power supply 32 is supplied to a terminal 84 which is connected through a variable resistor 86 to the junction point 40. Thus, the amplitude of a tare representing signal may be controlled by varying the resistor 86.

In view of the above explanation of various structure as shown on FIGURES 1 and 2, along with indications of the operation of certain component circuits therein, a complete and detailed understanding of the operation of the entire system may now be best accomplished by assuming an exemplary operation and introducing further component structure concurrently as the explanation of the operation progresses. Therefore, assume the presence of a load vehicle 10 (FIGURE 1) on the weight bridge or platform 12, which vehicle is empty and is to be loaded with a predetermined weight of substance 22. At the outset, it is desirable to compensate for the tare weight of the vehicle 10. Therefore, the variable resistor 86 (FIGURE 2) is set to provide sufficient current to balance the tare weight component signals. As a result, the current sum at the junction point 40 produces an output in the conductor 50 which causes the ratiometer 52 to manifest "zero."

The next operation involves setting a digital index 88 (FIGURE 2) to provide digital signals in a cable 90 representative of the desired load weight. The digital index 88 may comprise simply a plurality of binary switches or alternatively various other forms of binary signal generators for providing a set of binary-coded signals indicative of a numerical value. The signal representative numerical value so developed is applied through the cable 90 to a digital-to-analog converter 92 and to digital comparator 94 through a switch 100. Both digital-to-analog converters and digital comparators are well known in the prior art and a wide variety of different forms thereof exist which are satisfactory for use in the present system.

The analog signal output from the converter 92 is applied through a switch 98 and a conductor 96 to the junction point 40. In the actual operation under consideration the index 88 is manually set to indicate the desired weight load. The setting is then converted by the converter 92 to an analog signal during one mode of operation for application through the switch 98 to the junction point 40. During this mode of operation, the output from the converter 92 is a quantity in the form of a current signal which must be balanced by the accumulated load sensed by the load cells 14. That is, upon closure of the switch 98, an analog current signal is applied to the junction point 40 which indicates the quantity of the desired load remaining to be loaded.

Recapitulating, in one mode of operation, the junction point receives: positive signals representative of the tare weight of the system; i.e., the platform and the loading structure balancing negative signals representative of the weight input of the platform and the loading structure, and a load signal from the converter 92 indicative of the desired load. With the structure in this situation, the digital ratiometer indicates the weight which must be added to reach the desired load. This signal from the digital ratiometer 52 is applied by way of cable 53 through switch 55 (normally closed when switch 98 is closed) to the loading mechanism 106. At this point the start switch 104 is momentarily closed to actuate the loading mechanism and the material to be loaded is placed into the vehicle 10. As the material amount is increased the signal from the load cells 14 reaches a point where the signal from the converter is balanced. This point may be, for example, indicated by a change in polarity in the digital ratiometer, i.e., the output thereof changes from a minus polarity to a plus polarity at point of coincidence. Such polarity change is applied as a signal through the cable 53 and signals the loading mechanism to stop. At this point the digital ratiometer reads zero indicating that the tare weight signal applied, i.e., platform, load structure, and desired net load, has been balanced on the scale. In certain situations, such an arrangement is desirable; however, various other arrangements are also practical as will now be considered.

One alternative arrangement for using the system hereof involves the automatic operation as described with reference to FIGURE 1. In this mode of operation, the switches 98 and 54 are opened while a related switch 100 is closed. Again, the load vehicle is placed on the load platform and the variable resistor 86 is adjusted to compensate by applying a tare weight signal. Thereafter, the desired load is set into the digital index 88 from which representative signals are applied through the cable 90 and the switch 100 to the digital comparator 94 which also receives representative digital signals from the ratiometer 52. Thereafter, the start switch 104 is momentarily closed to actuate the loading mechanism 106, as well known in the prior art. As the loading proceeds the composite load signal developed by the amplifier 42 is applied to the ratiometer 52 which then manifests the ratio indicative of the accumulated load. Furthermore, the signals indicative of the accumulated load are applied through the cable 110 to the comparator for comparison with the signals from the digital index 88 that are received through the switch 100. When the comparator 94 detects coincidence between the two sets of digital signals (as may be accomplished by a plurality of gate circuits, or other means) a signal passes from the corparator 94 through a conductor 112 to the "stop" control of the loading mechanism 106. Thus, the loading operation becomes somewhat automatic after initiation. In this regard, the digital index 88 may in an actual operation comprise a monetary value tally or other structure wherein a predetermined load is manifest as a result of a certain monetary credit. As a specific example, the digital index 88 may comprise a coin-actuated apparatus which is incremented by the deposit of coins to reach a predetermined load. Thereafter, the start switch 104 is actuated with the result that the predetermined load, as paid for, is delivered to a vessel or load vehicle.

From the foregoing it will be recognized that the operator may obtain a net weight output indication from the ratiometer by simply returning the tare weight input signal from the digital index to zero and viewing the output of the ratiometer. Thus various items having different weights may be loaded together on one vehicle by setting the digital index to the desired aggregate load for that item plus all previous items as each item is loaded and then the net weight of the entire load determined as above pointed out.

There has thus been described an embodiment of the present invention which effectively and accurately operates to meter applied loads. The ratio concept is a significant aspect of this system wherein the transfer functions of the actual load cells (force transducers) are developed to manifest the actual measurement. In relation to the ratio mode of operation, it is important to provide a four-wire bipolar network in which each load cell structure is effectively isolated from the others. This aspect further permits independent scaling and compensation of the individual load cells as by means of a linearizing network as described above. Further significant features and aspects of the present invention reside in the technique of summing the outputs of individual load cells which technique may also be employed to compensate the tare weight of a vessel.

There has thus been described an operational weighing system, which is capable of precise operation yet which may be relatively inexpensively manufactured.

What is claimed is:

1. A measuring system for indicating an applied load, comprising:
   a platform for receiving said applied load;
   means for supplying a source of reference potential;
   at least one force transducer means, said force transducer means supporting said platform and having variable electrical characteristics in accordance with the load carried thereby;
   means for coupling said reference potential to said force transducer means whereby to deveop at least one force component signal representative of said applied load and said reference potential;
   a digital ratiometer means;
   means for coupling said reference potential and said force component signal to said digital ratiometer means whereby said digital ratiometer means manifests said load and whereby fluctuations in said reference signal are substantially negated.

2. A system according to claim 1 including a plurality of force transducer means and further including a plurality of isolation amplifiers one of which is operatively connected between each of said force transducer means and said digital ratiometer means.

3. A system according to claim 1 including a plurality of force transducer means and further including a plurality of linearizing networks, one of which is operatively connected between each of said force transducer means and said digital ratiometer means.

4. A system according to claim 3 wherein said linearizing networks each comprises a diode switching network for variously modifying a received signal in accordance with the amplitude thereof.

5. A system according to claim 1 further including a variable impedance means; means for connecting said variable impedance means to receive said reference signal whereby said impedance means may provide an output representative of tare weight; and means for coupling the output from said variable impedance means to said digital ratiometer.

References Cited

UNITED STATES PATENTS

| Re. 24,969 | 4/1961 | Golding | 177—200 |
|---|---|---|---|
| 3,153,459 | 10/1964 | Smith et al. | 177—210 XR |
| 3,177,701 | 4/1965 | Geortler | 177—210 XR |
| 1,407,078 | 2/1922 | Murray | 177—137 |
| 2,735,291 | 2/1956 | Quinn | 73—65 |
| 2,771,579 | 11/1956 | Ruge. | |
| 2,882,035 | 4/1959 | Lauler et al. | 177—164 |
| 3,063,638 | 11/1962 | Kolisch | 73—65 |
| 3,137,357 | 6/1964 | Brenner | 177—210 |
| 3,310,976 | 3/1967 | Bussell | 73—65 |

ROBERT S. WARD, JR., Primary Examiner

U.S. Cl. X.R.

177—116, 200, 210, 211